UNITED STATES PATENT OFFICE.

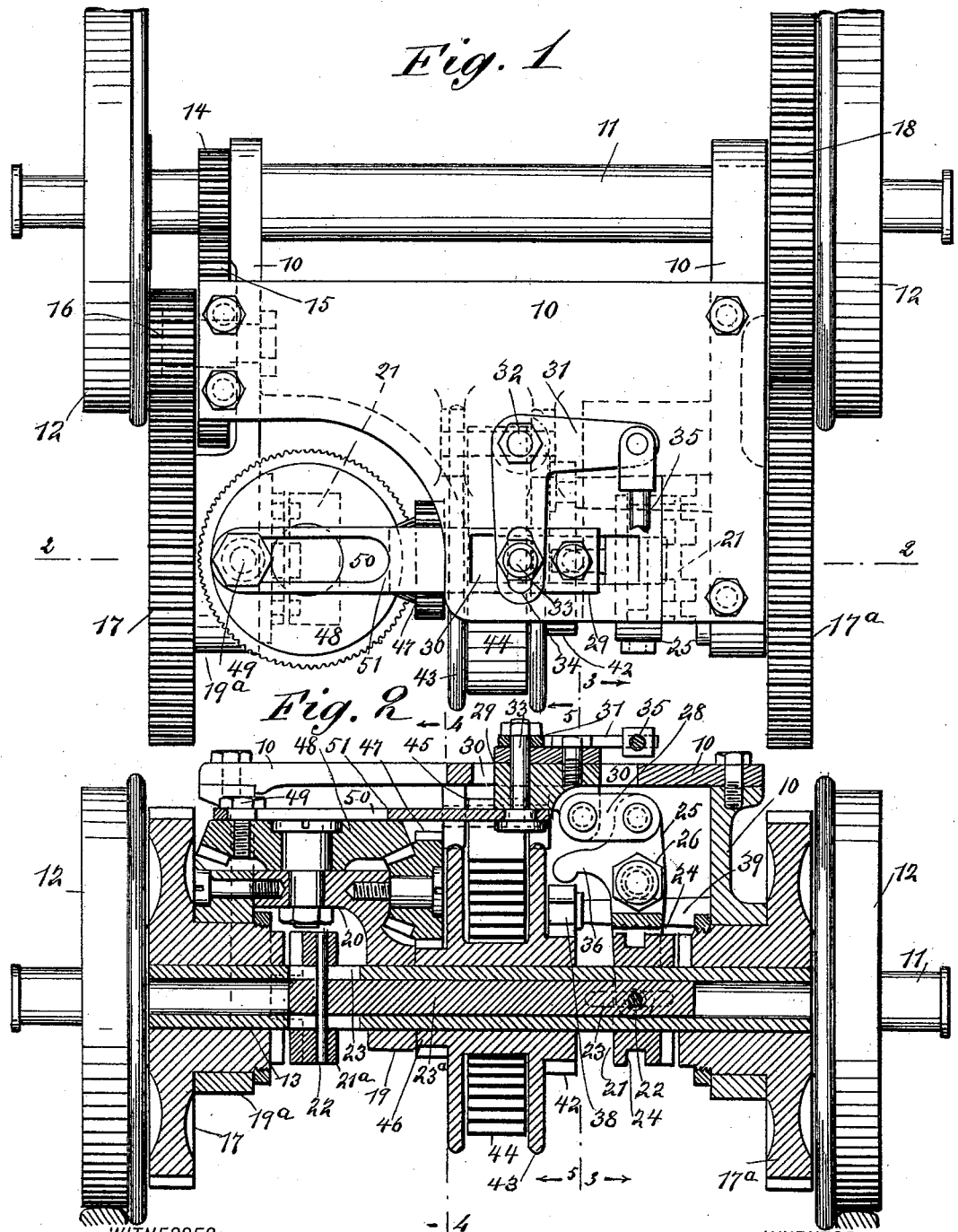

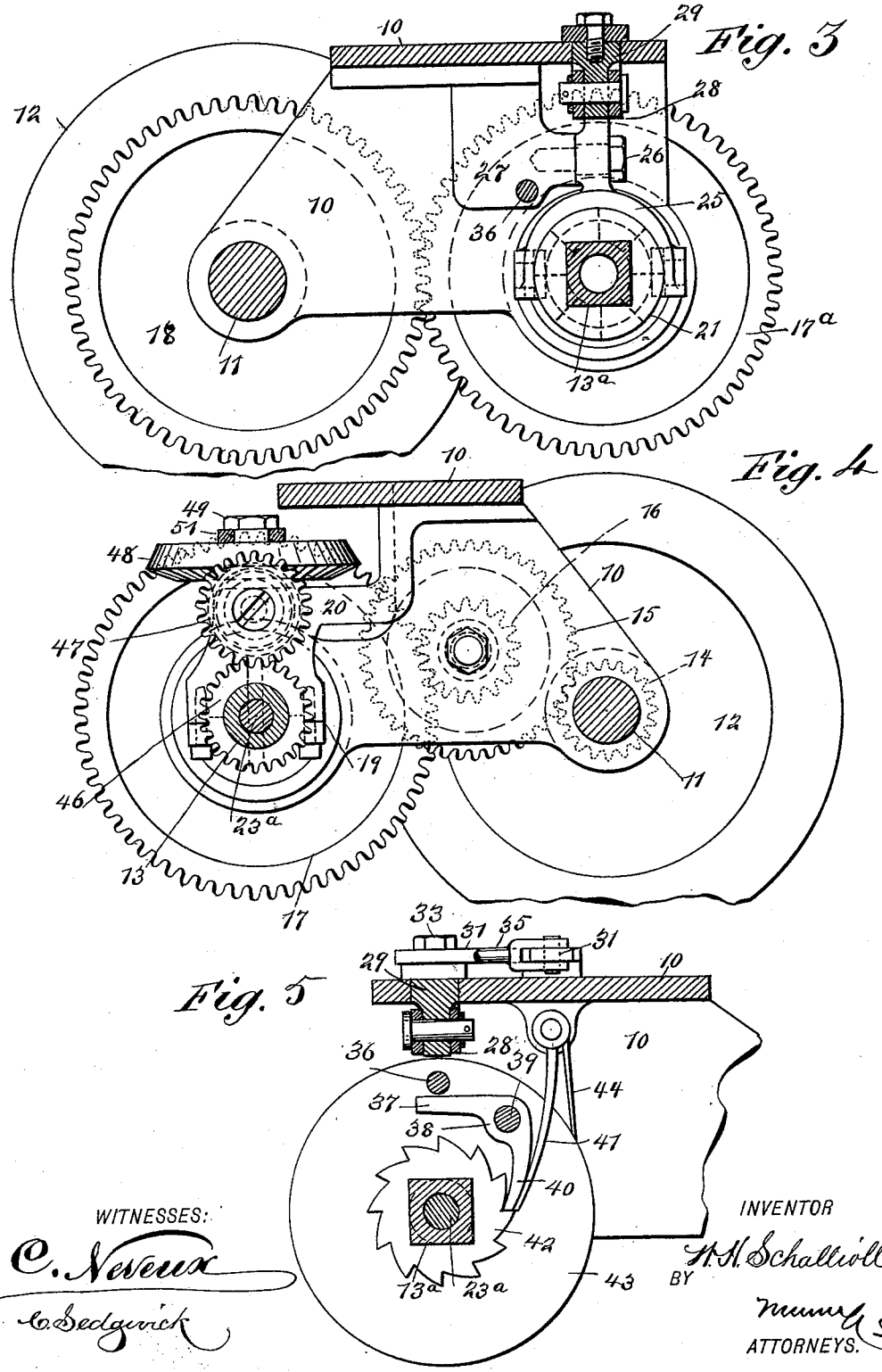

WILLIAM H. SCHALLIOLL, OF CHESTER, PENNSYLVANIA.

AUXILIARY CAR-MOTOR.

SPECIFICATION forming part of Letters Patent No. 500,432, dated June 27, 1893.

Application filed November 8, 1892. Serial No. 451,343. (No model.)

*To all whom it may concern:*

Be it known that I, WILLIAM H. SCHALLIOLL, of Chester, in the county of Delaware and State of Pennsylvania, have invented a new and Improved Auxiliary Car-Motor, of which the following is a full, clear, and exact description.

My invention relates to improvements in auxiliary motors and starters for cars, and the object of my invention is to produce a simple, convenient and durable spring motor which may be connected with the axle of any car, which is especially adapted for use on cable cars, to enable the cars to cross another cable without the use of horses; also to enable cars to change from one cable to another or to side track when not in use; which may also be applied to electric cars to enable them to be carried across a steam railroad track or other place where the circuit of the main line is broken, which may also be applied to any other car, which is adapted to have its spring wound up by the movement of the car. The aforesaid motor has automatic means for throwing it out of gear with the car axle when the spring is fully wound up, also in case gripman should grip cable or motorman make a connection with his circuit, the spring can only unwind just so far as crank 49 will come in contact with opposite end of slot 50, and thus also throw clutches in central position and out of gear with either gear wheel 17 and 17ª, thus preventing any breakage from negligence of gripman or motorman, and which may be thrown in and out of gear at will so as to cause it to be wound up or to apply its force to propel a car.

To these ends, my invention consists in certain features of construction and combinations of parts, which will be hereinafter described and claimed.

Reference is to be had to the accompanying drawings forming a part of this specification, in which similar figures of reference indicate corresponding parts in all the views.

Figure 1 is a plan view of the motor as applied to a car axle. Fig. 2 is a cross section on the line 2—2 in Fig. 1. Fig. 3 is a vertical section on the line 3—3 in Fig. 2, looking in the direction of the arrows. Fig. 4 is a vertical section on the line 4—4 in Fig. 2; and Fig. 5 is a vertical section on the line 5—5 in Fig. 2, looking in the direction of the arrows.

The motor is provided with a supporting frame 10, which may be of any suitable design, and this is journaled on the main axle 11 of the car wheels 12. The frame carries a transverse clutch shaft 13, which is hollow, and which is journaled parallel with the axle 11. This shaft near the center is rectangular in cross section, as shown at 13ª in Fig. 3, so that the spring spool which is carried by the shaft will always turn with the shaft. The shaft 13 is at one end geared to the axle 11, by means of speed reducing gear wheels 14, 15, 16 and 17, (see Figs. 1 and 4) and at the other end the shaft connects with the axle by the gear wheels 18 and 17ª. The gear wheels 17 and 17ª are journaled loosely on the shaft 13, and are adapted to be operated alternately by means of the clutch mechanism already described. The shaft 13 is made circular in cross section at a point opposite the bearing 19, which bearing is formed on a bracket hanging down from the horizontal support 20, (see Fig. 2) and a similar bearing 19ª is produced on the support 20, and in this bearing 19ª the hub of the gear wheel 17 depends. The shaft 13 carries two connecting clutches 21 and 21ª (see Fig. 2) and these clutches have teeth of the usual kind which engage similar teeth on the hubs of the gear wheels 17 and 17ª. An ordinary form of toothed clutch is shown, which it is not necessary to describe in detail, as it will be understood that any usual form of clutch may be employed. As shown in the drawings, the clutches 21 and 21ª are held to the shaft by pins 22, which extend through the shaft and slide in slots 23, and the pins also extend through the clutch rod 23ª, which connects the two clutches and enables them to be moved in unison. The clutch 21 has the usual circumferential groove 24, which engages in the ordinary way a forked lever 25, by which the clutch is shifted, and this lever is fulcrumed above the shaft 13 upon a support 27, as shown at 26 in Figs. 2 and 3, and its upper end connects by links 28 with a slide block 29, which is held to move parallel with the shaft 13 and in a slot 30 in the top of the frame 10. It will thus be seen that by shifting the slide block, the lever 25 may be tilted and the clutches 21 and 21ª moved longitudinally on the shaft 13, so as to throw either the gear wheel 17 or 17ª in gear with the shaft.

A bell crank 31 is pivoted on the frame 10, as shown at 32 in Fig. 1, and one arm of the bell crank extends forward, is slotted longitudinally, as shown at 34, and receives a bolt 33, by which it is secured to the carriage or slide block 29. The other member of the bell crank is pivoted to a rod 35, which extends horizontally above the frame 10, and may be operated by any ordinary lever mechanism such as the usual brake lever. It will be seen then that by tilting the bell crank, the slide block is operated and it will be understood that any other suitable lever may be employed for moving the block.

On one side of the clutch lever 25 is a laterally-extending arm 36, which projects above one arm 37 of an elbow or pawl 38, (see Figs. 2 and 5) which is fulcrumed at its elbow on a support 39 and has its lower arm 40 pressed by a spring 41, into engagement with the teeth of a ratchet wheel 42, which ratchet wheel is formed on the hub of the spring spool 43, and the latter is secured to the square portion 13ª of the shaft 13, as shown in Fig. 5, and is provided with a strong coiled spring 44, one end of which is secured to the spool and the other to a convenient portion of the frame, as shown at 45 in Fig. 2.

It will be seen that when the upper end of the lever 25 is thrown to the right, the clutches 21 and 21ª will be thrown to the left, and the clutch 21ª made to engage the gear wheel 17, so that the movement of the car axle will, through the connected gearing, turn the shaft 13 and spool 43 and wind up the spring 44, and the pawl 38 will prevent the unwinding of the spool. When, however, the lever 25 is moved in the opposite direction the clutch 21 is thrown into engagement with the wheel 17ª, and the arm 36, acting on the pawl 38, releases the ratchet wheel 42, and the spring 44 unwinds and transmits motion from the shaft 13 through the gear wheels 17ª and 18 to the car axle. It will be understood that the gearing for winding up the shaft 13 may be arranged so as to move slowly and require but very little power to operate it.

The following mechanism is employed to automatically shift the clutches and prevent the breaking of the spring or any of the mechanism during the winding up of the spring. On one end of the hub of the spool 43, is a gear wheel 46, (see Fig. 2) which meshes with a bevel pinion 47, journaled on the support 20 above the gear wheel 46, and the pinion 47 meshes with a horizontally turning gear wheel 48, which is journaled on the top of the support 20, and which carries a crank 49 on its upper side, which crank moves in a slot 50 of a horizontal link 51, and this link at one end is connected with the bolt 33 of the slide block 29. The gearing connecting the crank 49 with the spool is timed so that when the spool is completely wound up, the crank 49 will have moved to the inner end of the slot 50, and striking the wall of the slot, will shift the link 51 and slide block 29, so as to cause the latter to move the lever 25 and the clutches 21 and 21ª, and bring the clutches into a central position out of gear with either of the wheels 17 or 17ª.

From the foregoing description it will be seen at once, that by throwing the clutch 21ª into engagement with the gear wheel 17, the spring 44 will be wound tightly by the movement of the car, and that the mechanism just described above will throw the spool out of gear when the spring has been completely wound. It will also be understood that by the simple movement of the lever, the ratchet wheel 42 may be released and the spring spool thrown again in engagement with the car axle, but in a way to transmit power to it instead of to receive power from it. Sufficient power may be carried in the spring to propel the car for some little distance so as to at least move it over the space through which it is usually pulled by horses, if it be a cable or electric car.

Having thus described my invention, I claim as new and desire to secure by Letters Patent—

1. The combination, with the car axle, of a shaft journaled parallel with the axle and provided with a spring barrel, gear wheels journaled loosely on opposite ends of the shaft and connected by separate trains of gearing with the axle, the gearing being arranged so that one train will wind the shaft and the other transmit power from the shaft to the axle, and connected clutches held to slide on the shaft and adapted to connect with either of the gear wheels, substantially as described.

2. The combination, with a car axle, of a shaft journaled parallel with the axle, a spring barrel or spool carried by the shaft and provided on one side with a ratchet wheel and pawl, a clutch-controlled winding gear mechanism connecting the axle with the shaft, a clutch-controlled driving gear mechanism connecting the shaft with the axle, and a lever mechanism for automatically releasing the ratchet wheel by throwing the shaft in gear with the driving mechanism, substantially as described.

3. The combination, with a car axle, of a shaft journaled parallel with the axle, a spring spool or barrel carried by the shaft, a clutch-controlled winding gear connecting the axle with the shaft and adapted to wind up the spring, a clutch-controlled gear mechanism connecting the shaft with the axle and adapted to transmit power to the latter, and a gear mechanism for throwing the winding gearing out of gear when the spring is wound up, substantially as described.

4. In an auxiliary motor, the combination with the main shaft having a clutch-controlled gear connection with a car axle, and the spring spool carried by the shaft, of a slide block held to move parallel with the shaft, a lever connection between the slide block and the clutch, a revoluble gear wheel geared to the spring spool and provided with a crank, and a link connection between the crank and the slide block, substantially as described.

5. In an auxiliary motor, the combination of the motor shaft, the clutch-controlled driving gear mechanism connecting the shaft with a car axle, a spring barrel or spool carried by the shaft, a ratchet wheel secured to the barrel, the tilting pawl held to lock the ratchet wheel and barrel, and the clutch lever operatively connected with the clutch and having an arm to engage and release the pawl of the ratchet wheel, substantially as described.

6. The combination, with the car axle, of the motor shaft journaled parallel with the axle, the spring barrel carried by the shaft, gear wheels journaled loosely on opposite ends of the shaft, a train of gearing connecting one of the gear wheels with the car axle, so that the movement of the axle will turn the gear wheel and shaft in one direction, a train of gear wheels connecting the axle with the opposite loose gear and adapted to transmit power from the gear wheel to the axle, connected clutches held to slide on the shaft and to alternately engage the gear wheels, a lever-operated slide block held to move parallel with the shaft, and an operative lever connection between the slide block and the clutches, substantially as described.

WILLIAM H. SCHALLIOLL.

Witnesses:
HORATIO R. CRITCHLEY,
EDW. S. COX.